United States Patent [19]

Carmon et al.

[11] Patent Number: 5,724,587
[45] Date of Patent: Mar. 3, 1998

[54] SYSTEM FOR CONTROLLING TASK EXECUTION IN A HOST PROCESSOR BASED UPON THE MAXIMUM DMA RESOURCES AVAILABLE TO A DIGITAL SIGNAL PROCESSOR

[75] Inventors: Donald Edward Carmon, Durham; William George Crouse; Malcolm Scott Ware, both of Raleigh, all of N.C.

[73] Assignee: International Business Machines Corporation, Armonk, N.Y.

[21] Appl. No.: 474,713

[22] Filed: Jun. 8, 1995

Related U.S. Application Data

[63] Continuation of Ser. No. 270,519, Jul. 5, 1994, abandoned, which is a continuation of Ser. No. 761,534, Sep. 18, 1991, abandoned.

[51] Int. Cl.$^6$ .............................. G06F 9/00; G06F 12/00
[52] U.S. Cl. .................... 395/674; 395/670; 395/200.01
[58] Field of Search .................................. 395/674, 670, 395/200.01, 694

[56] References Cited

U.S. PATENT DOCUMENTS

| | | | |
|---|---|---|---|
| 4,862,452 | 8/1989 | Milton et al. | 370/62 |
| 4,930,069 | 5/1990 | Batra et al. | 364/DIG. 1 |
| 5,195,092 | 3/1993 | Wilson et al. | 370/94.2 |
| 5,303,369 | 4/1994 | Borcherding et al. | 395/650 |
| 5,377,332 | 12/1994 | Entwistle et al. | 595/325 |

FOREIGN PATENT DOCUMENTS

| | | | |
|---|---|---|---|
| 0317481 | 5/1989 | European Pat. Off. | G06F 15/16 |

OTHER PUBLICATIONS

Yu et al, Constant Capacity—An Information Theoretic Approach to VLSI/DSP Architecture, Icassp '89 Acoustics, Speech & Sp Conf. pp. 2528–2531.

Kloker et al, The Motorola DSP96002 IEEE Floating–Point DSP, Icassp '89, Acoustics, Speech & DP Conf. pp. 2480–2483.

"The Cyclic Executive Model and Ada" by T.P. Baker and A. Shaw, Real Time Systems, vol. 1, No. 1, Jun. 1989, Dordrecht, NE, pp. 7–25.

"Time–sequenced DMA for Multimedia Computers" by S. C. Wray, Computer Architecture News, vol. 19, No. 4, Jun. 1991, New York, New York, pp. 132–137.

Patent Abstracts of Japan, vol. 011, No. 032, Jan. 30, 1987, publication #JP61201338 dated Sep. 6, 1986, "Processor for Data Flow".

*Primary Examiner*—Lucien U. Toplu
*Attorney, Agent, or Firm*—Steven B. Phillips

[57] ABSTRACT

A multi-media user task (host) computer is interfaced to a high speed DSP which provides support functions to the host computer via an interprocessor DMA bus master and controller. Support of multiple dynamic hard real-time signal processing task requirements are met by posting signal processor support task requests from the host processor through the interprocessor DMA controller to the signal processor and its operating system. The signal processor builds data transfer packet request execution lists in a partitioned queue in its own memory and executes internal signal processor tasks invoked by users at the host system by extracting signal sample data from incoming data packets presented by the interprocessor DMA controller in response to its execution of the DMA packet transfer request queues built by the signal processor in the partitioned queue. Processed signal values etc. are extracted from signal processor memory by the DMA interprocessor controller executing the partitioned packet request lists and delivered to the host processor. A very large number of packet transfers in support of numerous user tasks and implementing a very large number of DMA channels is thus made possible while avoiding the need for arbitration between the channels on the part of the signal processor or the host processor.

6 Claims, 13 Drawing Sheets

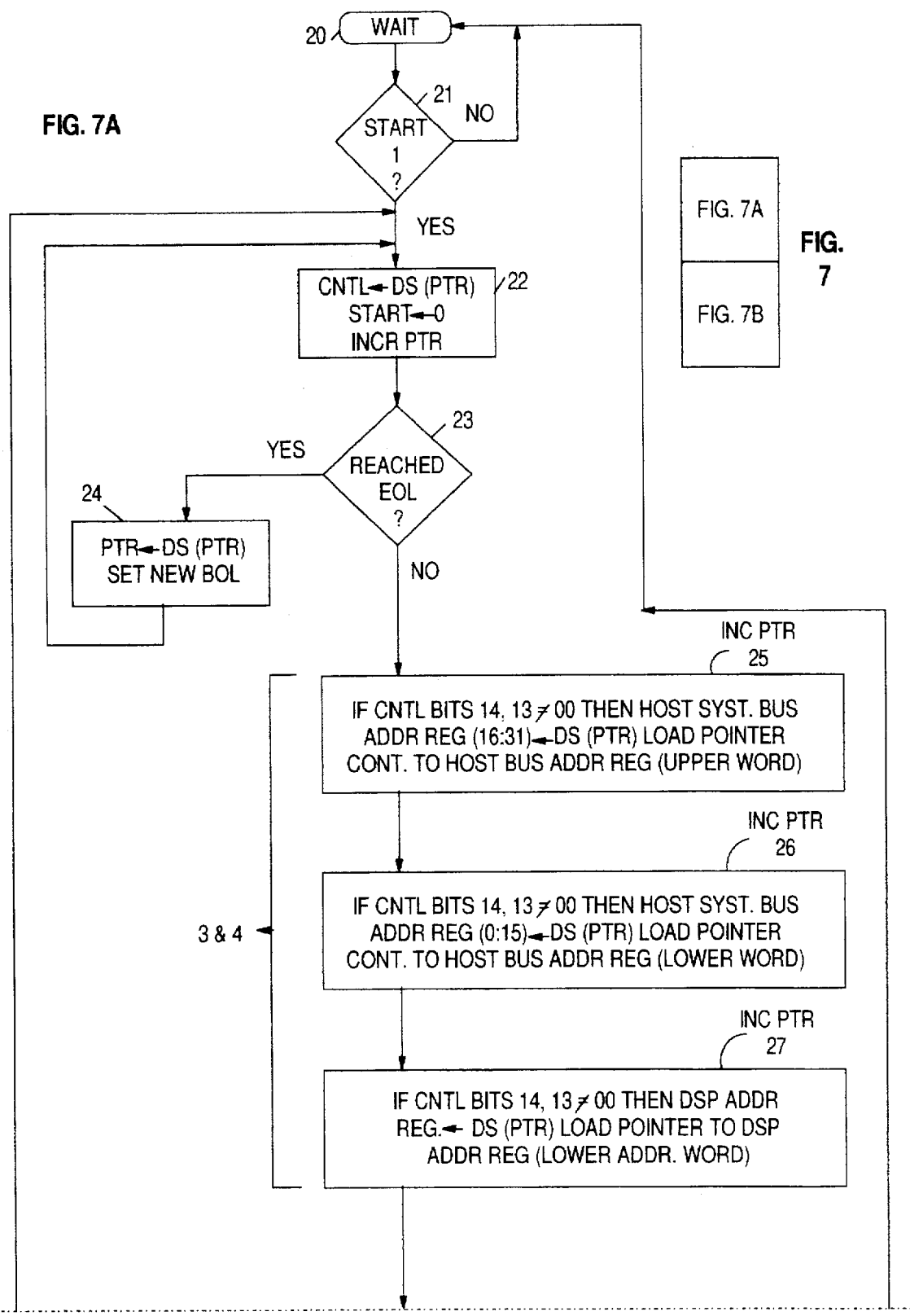

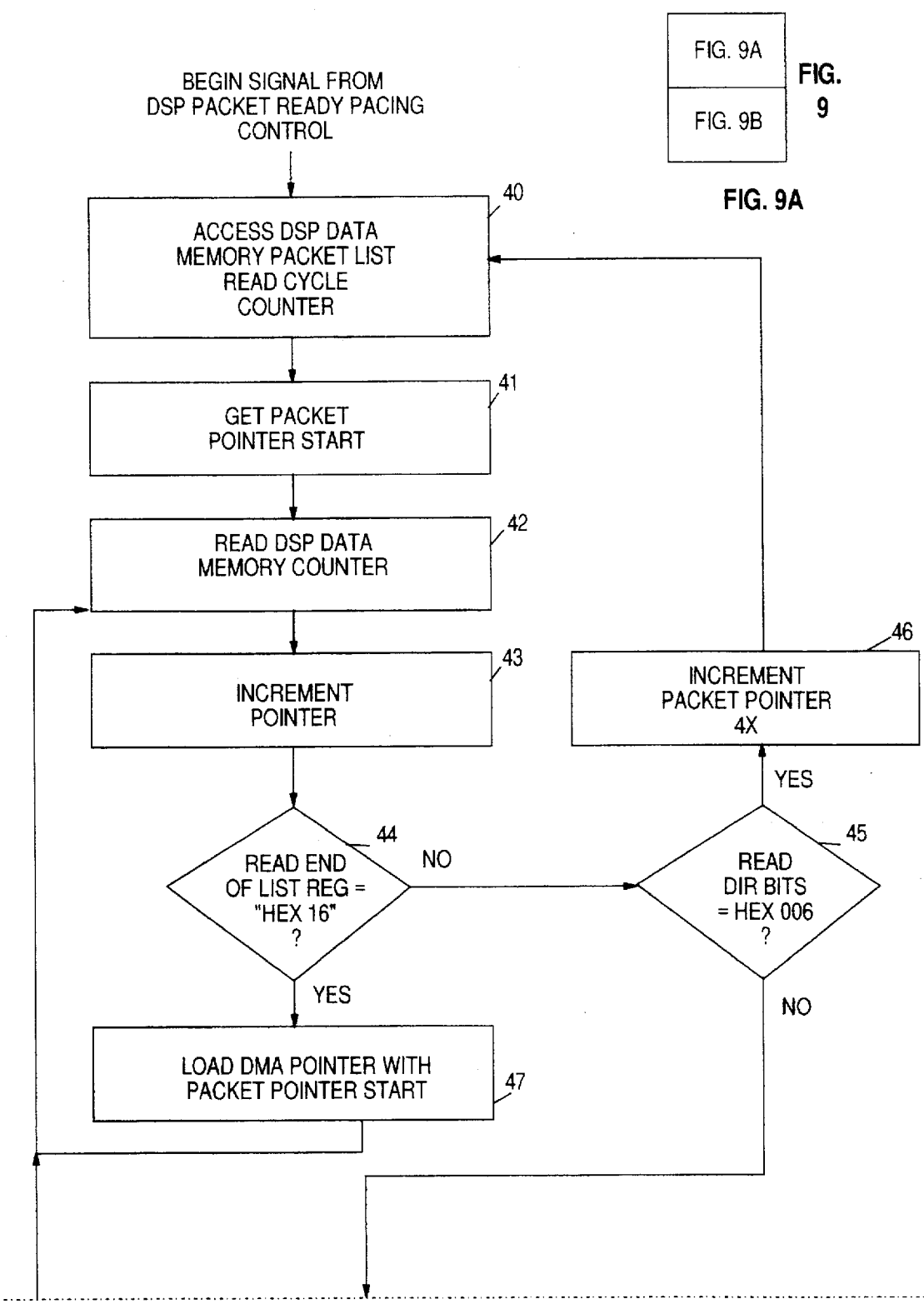

SYSTEM FOR CONTROLLING TASK EXECUTION IN A HOST PROCESSOR BASED UPON THE MAXIMUM DMA RESOURCES AVAILABLE TO A DIGITAL SIGNAL PROCESSOR

CROSS REFERENCE TO RELATED APPLICATION

This application is a continuation of application Ser. No. 08/270,519, filed Jul. 5, 1994, now abandoned, which in turn is a continuation of application Ser. No. 07/761,534, filed Sep. 18, 1991, now abandoned.

FIELD OF THE INVENTION

This invention relates to signal processor computer system in general and to direct memory access control; more specifically, it relates to a dynamic, hard real-time, multi-task signal processing demands commonly encountered in multi-media computer systems.

PRIOR ART

Signal processors are well known components in numerous computer systems presently available. Specialized Digital Signal Processors (DSPs) are commercially available from a variety of manufacturers and are utilized for the high speed, iterative execution of algorithms employed to provide digital signal filtering, speech recognition or speech synthesis, servomechanism control, encoded speech generation, compact disk hi fi sampled sound and music generation, modem data modulating and demodulating functions, facsimile data transmission encoding and decoding functions, color and monochrome image data compression and display functions, motion video processing functions and numerous data protocol conversion or encoding, error correcting or similar functions. In fact, the suggested lists of potential digital signal processor applications for high speed, repetitive execution of such algorithms as Fourier transforms, etc. on a high speed stream of digital analog signal samples are widespread in the industry.

A particularly advantageous signal processor architecture is shown in U.S. Pat. No. 4,794,517 assigned to the assignee of this present application; reference may be had thereto for an understanding of how digital signal processors may be built and utilized. However, it is evident to those of skill in the art that the aforementioned signal processor architecture is but one of many competing ones available in the marketplace. Additionally, the uses for digital signal processors are expanding at almost geometric rates, particularly in the growing field of the so called multi-media computer systems. In such systems a user may simultaneously wish to execute numerous functions such as speech encoding for transmission, motion video, modem transmission and reception and perhaps background CD music reproduction to name but a few audiovisual or multi-media applications. These applications may be run on a typical host system such as an IBM Personal System/2 computer or any of a variety of similar available multi-tasking computer systems commonly sold today.

In such multi-media systems, signal processing tasks are usually offloaded (via DMA) to the specialized, high speed digital signal processor (DSP). However, as speed and memory capacity of processors increase, the DSP may take on execution of the user tasks themselves as will become evident later. Indeed, in such a system, DMA function itself could be handled by the DSP. If only a few channels of DMA access are required, a typical DMA controller may allow the signal processor and the host processor to service one or several hardware devices. However, where the host processor is a multi-tasking one and a large number of I/O devices exist, the provision of only a few DMA channels between the host multi-tasking processor and the supporting digital signal processor may become a bottleneck which is insurmountable when the DMA facility is simultaneously shared by all operating I/O devices and various threads of task execution which are running.

Consider a typical multi-media environment that may have numerous high fidelity audio signal samples being processed utilizing independent host memory tables of audio samples and multiple memory control tables and energy and pitch envelopes stored in memory, and one encounters a system with a need for providing more than one hundred separate channels of DMA access in a time period less than a millisecond. With 16 hi fi stereophonic audio signal channels, each audio channel requires transfer of 88,200 sample byes per second. In such a short time, one may consider that 100 channels of DMA are supporting over 100,000 block transactions per second, with each block having its own unique source and destination address and block transfer size. Using a conventional DMA access device, a system processor such as the digital signal processor would have to be interrupted for a new data transfer to support the required operations on the average of about every 10 microseconds. Several machine cycles would be required to support each transfer and the system would soon become inoperative since no processor resource would remain capable of executing the actual signal processing tasks in addition to those required to control the DMA accesses.

In addition to typical audio applications, there may be other host tasks under execution that require communication between the digital signal processor and the host processor while the audio signals are being "played". An example might be a facsimile modem moving image data to or from the host computer's system memory in conjunction with the audio music, speech or background being "played". In addition a speech recognition task may be running which requires the moving of speech templates to and from the host system memory to the signal processor's memory for matching purposes and then writing back speech recognition tokens as they are recognized. A speech synthesis function may also be operating and is retrieving phoneme data from the system memory bank while a computer-aided display application may be running in which the signal processor is required to rotate a three dimensional object found in an image screen buffer which requires numerous complex iterative calculations. The point being made is that a huge number of effective DMA channels may be required in a complex multiprocessor and multi-tasking environment supported by a signal processor.

Multiple DMA controller chip devices are known such as that shown in U.S. Pat. No. 4,831,523. Such devices operate as peripheral device controllers and are designed to connect a fixed number, four in the case of the presently cited reference, of physical peripheral devices to a system bus. Physical devices are not the equivalent to multi-tasking processes that require hard, real-time, processed signal samples in order to carry out the task processes that a user desires. Four physical peripheral devices show a limit of approximately eight logical DMA channels and, in the cited reference, devices are not serviced within any fixed amount of time since the devices are serviced in a round robin fashion and one device may take an arbitrarily long time to complete its work, thus removing the ability for any other real-time device to complete its work within a fixed period of time.

A direct memory access channel sharing mechanism is also shown in the IBM Technical Disclosure Bulletin, Vol. 30, No. 7 published December, 1987, pages 369 and 370. However, the mechanism shown requires I/O device hardware that can be dynamically reassigned. It appears that this mechanism is a software one which dynamically assigns a small number of hardware DMA channels to requesting external hardware devices which permits the sharing of the DMA channels. There is no deterministic information on the size, number or time period in which grant of service for any requests may be made and no details are given as to how the hardware device may make such a request. The system shown is not real-time in nature, i.e. requesting tasks whose signal samples are to be processed and delivered do not have to be serviced within precise and repetitive time increments such as a CD music reproduction system with 88,200 bytes of information per second to be transferred, processed and the processed signals retransferred back for usage by the requesting task.

U.S. Pat. No. 4,807,121 shows a peripheral interface system having an input/output processor connected to up to four multiplexing units with each such unit providing an interface for up to four controllers. The I/O processor has a DMA channel that receives multiplexed serial data from the multiplexers. Data is transferred between the I/O processor and any controller unit by filling the storage area in a buffer from local memory of the I/O processor in a serial fashion over a DMA channel. Only a single channel is provided and the multiplexing scheme allows it to be utilized. Data parcels are transferred from the controller to the multiplexer on a time slot basis and from storage of the multiplexer to the memory in a serial fashion. However, there is no indication that this system has any means of supplying the dynamic, hard real-time requirement that would be presented by application tasks of the sort as alluded to above running simultaneously.

OBJECTS OF THE INVENTION

In light of the foregoing difficulties in the known prior art, it is an object of this invention to provide an efficient multi-media computer system and data transfer mechanism to support hard real-time multi-tasking operations in a host processor.

BRIEF SUMMARY OF THE INVENTION

A solution to the foregoing problem is provided in the preferred embodiment of the invention by presenting task requests to the signal processor from the host processor, analyzing incoming requests for tasks, and building a list of packet transfer requests in a partitioned queue in memory, accessing the partitioned queue with an interprocessor DMA controller and moving the necessary data signal samples in or out of the signal processor (DSP) via the DMA mechanism within a fixed minimum prescribed time period. Data transfer packet request lists are made up by the digital signal processor (DSP) in the form of DMA control packets for this embodiment.

The present invention is embodied in a multi-media computer system comprising a first digital processor (DP), a second digital processor which is a specialized type of processor called a digital signal processor (DSP), and means for controlling the first digital processor so that it presents to the digital signal processor only those signal processing requests whose combined direct memory access (DMA) resource requirements do not exceed the digital signal processor's DMA resource capacity.

Each packet request contains several words of control information and the source and destination address for the movement of the data samples. One address is the affected system memory address which will contain or which will receive data or process samples, respectively. The second address is the affected local DSP instruction or data memory address to or from which raw signal samples or processed signal samples will be written or read. The control information incorporated in the packets includes a number of data or instruction bits which represent the size of the data block to be moved, and the direction of flow, i.e. whether information is to flow to or from the DSP. The DMA packet list constructed by the DSP's operating system is held in the DSP's data memory and is sequentially accessed and executed by the DMA controller hardware interfacing to the DSP's buses and to the host processor buses. The DMA processor accesses and processes the full content of one partition in the partitioned list of packet requests at regular time intervals which are related to the maximum demand of any possible selected user task running in the host processor. For example, to support digital music sample processing for audio playback from stereophonic CD players, 88,200 16 bit samples must be delivered to the signal processor, processed and presented to the digital to analog converter or to the host processor on a regularly recurring basis during each second.

BRIEF DESCRIPTION OF THE DRAWINGS

The foregoing and still other objects of the invention are in a preferred embodiment which is further described and illustrated in the drawings in which.

DETAILED DESCRIPTION OF THE PREFERRED EMBODIMENT OF THE INVENTION

Figure 1:
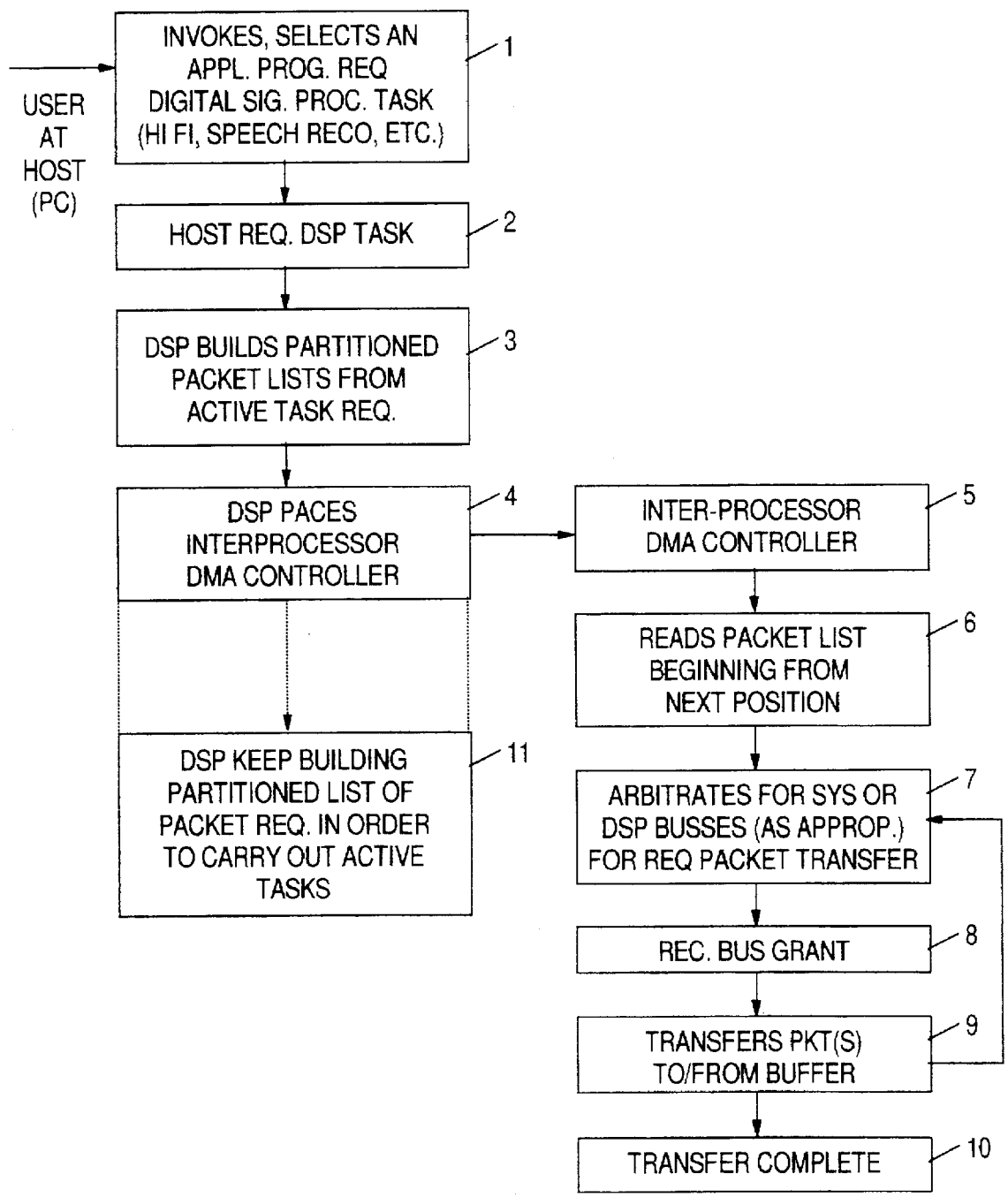
FIG. 1 illustrates a preferred embodiment in schematic form with the operational flow of data to and from the host processor and the digital signal processor via the interprocessor DMA controller which interfaces to the requisite system address and data buses in both the host system and the digital signal processor system.

A full description of the preferred embodiment of the invention will be given with respect to the illustrations thereof shortly. At the outset, however, it is deemed desirable to illustrate the magnitude of the problem encountered and to further illustrate the efficiency and improvement provided by utilizing the system and DMA packet controller mechanism of the present invention.

The management of data flow to and from a Digital Signal Processor Subsystem (DSP) could, as noted above, pose potentially tremendous loads on the DSP. As an example, one may consider a commercially current computer such as the Motorola 68030 which is a commonly available processor forming the core of many PC's. A typical DSP might be the Motorola 56000 PC processor which may be implemented on the planar board of the processor. There is a DMA path between the 56000 and the 68030; however, the DMA hardware only relieves the host processor 68030 and does nothing to improve the functioning of the DSP 56000. For each word which must be moved between the 68030 and the 56000, there is a brief interruption to the 68030. During the interruption, the bus of the host processor is granted to the DMA device which then moves a word of data or signal sample. However, once the word is acquired by the DSP, the DSP must actually be interrupted. The DSP must stop what it is then doing and move the data word into its memory via an interrupt handler.

An estimate of the number of DSP processor cycles to accomplish this is about 10. There is approximately a one cycle loss due to the three-phase pipeline in the 56000; two to three more processor cycles are required to save the contents of a few registers, several more cycles of processor are required to establish an index pointer to the DSP memory and to the modulo counter index control. Finally, several additional processor cycles are required to restore the DSP machine state and return to the task that was interrupted. This all amounts to approximately 10 processor cycles required to move only a single word of data or sample to or from the DSP. This DSP is of the type noted and referred to earlier as illustrated in U.S. Pat. No. 4,794,517 which is also a three-phase pipelined DSP architecture.

The present invention provides an improved multi-media system using a DMA packet machine, i.e. a programmed mechanism for providing the data transfer in a more efficient way. DMA transfers are initiated by software requests made by the DSP, not by the DMA mechanism. The DMA mechanism, which is the controller and arbiter, gets guaranteed service from the DSP within time windows that repeat and have a length according to the most demanding task to be supported in the host processor's menu of multiple tasks. For example, a time window of 726 microseconds is capable of meeting 32 bit (full word) samples necessary to support the typical 88,200 digital stereo audio samples for playback on the average of every 726 microseconds. At the typical speed of operation of the DSP, over 100 such 32 bit packets could be processed within the 726 millisecond time interval. This would provide capacity for more than 100 unique transactions or communication channels for data flow between tasks in the multiprocessing host system and operations performed in the DSP subsystem.

When the DMA controller reads a packet transfer request placed in a partitioned queue by the service-requesting DSP task as it executes, the DMA arbiter and controller will arbitrate for the host system bus, e.g. the IBM PS/2's microchannel or equivalent host bus and, when access to the bus is granted by the host system to the DMA controller and arbiter for the request placed by the DSP, up to 16 bytes (dependent on buffer size) of data may be moved to a first in first out (FIFO) register buffer in the DMA controller. Once the bytes are in FIFO, the DMA arbiter and controller will arbitrate for the local DSP databus and once granted, will move one 16-bit word and then drop the bus request. This word will then be moved to the DSP's memory and the DSP processor will be halted for one bus cycle. Thus, for each word moved, the process will consume one cycle in the DSP. The DMA controller and arbiter will continue to arbitrate for the local DSP bus until the entire contents of the FIFO within the DMA controller has been emptied. The DMA controller will then make a new request to the host system buses for more data to be moved.

It will be noted that the process for arbitrating for either the system bus or the DSP bus is most efficiently conducted by dedicated programmed hardware and processes such as those implemented in a DMA arbiter and controller. The packet list processing capability of the DMA controller allows efficient utilization of both a host system bus and the DSP bus. Recalling the prior art design briefly described above, it may be seen that a savings of nine out of ten average DSP cycles will be realized with this design.

For example, returning to the aforementioned stereo hi fi signal processing task required to support stereophonic CD music, one must play out the standard 88,200 16-bit digital samples every second. This requires the transfer of 88,200 words of data every second between the host system processor which will be reading the CD disk, transferring the read samples to the DSP, receiving processed audio samples from the DSP and reconstructing them in analog integrated sound segments at the rate of 88,200 per second. In the prior art machine and system noted above, this operation alone would require 88,200 words per second times 10 cycles per word or 882,000 cycles per second of DSP cycle capability to be exercised. In the preferred embodiment of the present invention, only 88,200 DSP cycles will be required, or about one tenth of those utilized in the prior art.

Turning to an example of a DMA arbiter controller and list processor system in use, let us suppose that a speech recognition task and a stereo hi fi CD audio playback task are running simultaneously, as selected at the host processor by a user, and which require the facilities of a DSP to support them. The speech recognition task will need approximately two DMA channels for operation, one incoming and one outgoing, each with a peak rate of approximately 256 words per channel. The CD music task will require one DMA channel with a peak rate of about 64 words for its channel. Each time the CD audio task runs and the signal processing tasks on the samples are run in the DSP, the DSP will need to move 64 more words of data from the host system processor memory to the DSP memory. To do this, the DSP will call its operating service routine for a DMA request each time it runs. On each call, it will provide the next system processor address to be accessed and the next internal memory address and beginning count where the 64 words to be fetched may be stored. Each time the speech recognition task runs in the DSP, it will call the DSP's DMA request service routine twice. Each request will have a unique system address at the host system from which information is to be withdrawn or to which it is to be delivered and a unique DSP memory address where the samples are to be stored or from which they are to be fetched. The DSP will download two recognition templates each time its iterative task runs in the DSP. Each template will be approximately 256 words in length.

The three DMA requests represented by the single request for the CD task and the two requests for the speech recognition task will be placed in a segmented queue by the DSP as they occur. As an example, the speech recognition task may have begun and placed its first request and then have been interrupted while the CD task in the DSP took control and placed its DMA request. After the CD task request was done, the speech recognition task may be restarted and it will place its second DMA request. If only these three requests were placed during one 726 microsecond interval during which a partitioned queue is built by the DSP, they will not be serviced by the DMA controller during the time that they are being placed in the queue. At the next interrupt of a 1,378 hz. clock (1/726 microseconds) the next group of DMA request packets that were placed in the previous 726 microseconds will be accessed and processed by the DMA controller and arbiter.

In the present example, the DMA controller arbiter will first find the packet request that asks for 256 words to be moved for the speech recognition task. It will load up the indicated control words from the packet request to see how many words to move and will load the modulo addressing control boundaries. It will then read the host system memory address and the DSP memory address and arbitrate for the host memory bus. Once a grant to the host memory bus is received, the DMA controller and processor will burst a number of bytes (16 bytes in this embodiment) of data from the host system processor memory to its own internal buffer. It will then arbitrate for the DSP bus and each time it receives a grant, it will write another word into the DSP memory according to the DSP beginning memory address which it read from the DMA packet control request. After all 16 bytes have been written, it will go back to arbitrate for the host system memory bus again. The process will continue until all 256 words have been moved. Then the DMA machine will read the next packet in the DMA packet transfer request list. According to this example, this will be the CD task packet. For this packet, 64 words are to be moved utilizing the same operation as previously described. When all 64 words have been moved, the DMA arbiter and controller will access the next packet transfer request which will be the second packet for the speech recognition task and, after processing it in the same fashion, will see no more packets and will enter a "wait state" until the 726 microsecond time window has elapsed. If more DMA packet requests have been arriving by being placed in the partitioned queue built by the DSP during the current 726 microsecond window, they will not be serviced until the next time window.

Turning to FIG. 1, the overall operational flow of this type of process may be briefly envisioned beginning in Box 1 of FIG. 1, the user at the host PC starts the operations by invoking or selecting application program requests for execution at the PC which will necessarily involve digital signal processing tasks for their support. Examples might be high fidelity audio playback, speech recognition, modem data transfer and facsimile data functions, motion video, speech synthesis or any of a variety of applications from the multi-media environment that are well understood to those of skill in this art.

The host PC will request DSP tasks to be executed by transmitting identification of the tasks requested to the operating system of the DSP. This occurs in Box 2 of FIG. 1.

Figure 10:
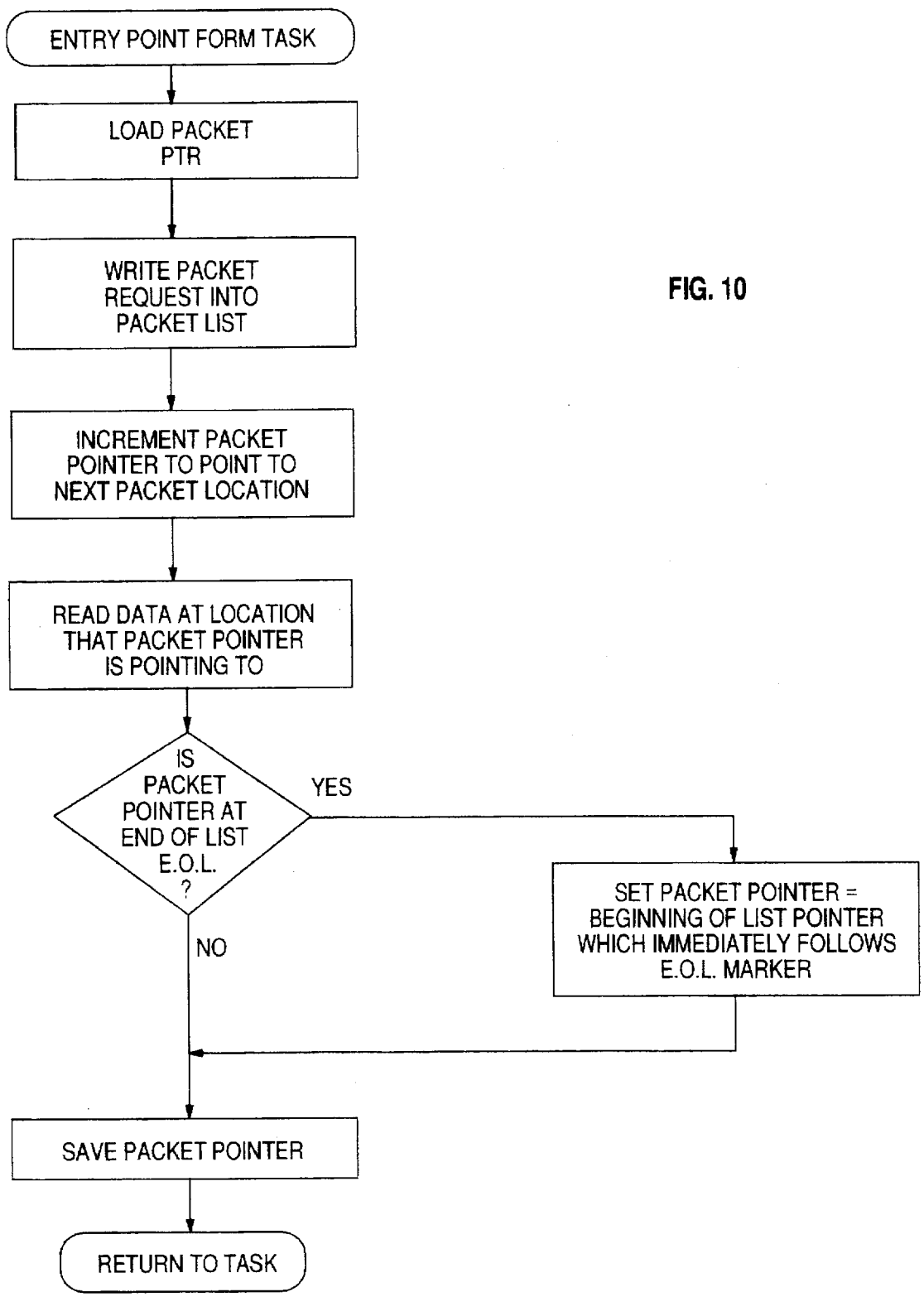
FIG. 10 illustrates a high-level flow chart of the packet list construction process in the DSP.

In Box 3, the DSP operating system builds partitioned packet lists from any active task requests, placing an end to the partition of requests at repetitive time intervals. FIG. 10 shows the high-level process flow for the DSP's packet list building operations. In one preferred embodiment as discussed above, these repetitive "End of List" (E.O.L.) time intervals occur at every 726 microseconds.

The DSP will pace or clock an interprocessor DMA controller as shown in Box 4 at the clock rate of every 726 microseconds and will continue building partitioned packet request lists in order to carry out any active tasks which may be running in the DSP or which are requested by new user requests coming from the PC as shown in Box 11.

In Box 5, the interprocessor DMA controller will receive the pacing clock signal beginning a 726 microsecond time interval from the DSP as shown. In Box 6, the interprocessor DMA controller begins reading the packet list from a partition of the DMA request packet list built by the DSP. The DMA controller will arbitrate for the system or DSP data or memory buses as appropriate for the requested packet transfer as shown in Box 7, will receive the bus grant for access to the appropriate bus as shown in Box 8 and will then transfer a number of packets to or from the DMA buffer in Box 9 and rearbitrate for access to the system or DSP buses as shown by the linkage between Box 9 and Box 7 until all transfers are complete as shown in Box 10.

As is apparent from the foregoing brief description of flow with respect to FIG. 1, some management by the host system (or by the DSP if it has sufficient capacity, or by an auxiliary processor if desired) must be exercised so that DSP task requests can all be processed within the minimum time interval of, for example, 726 microseconds, or suffer the consequence that any further requesting user task may not have its needs fulfilled in hard real-time. To accommodate this requirement, a DSP resource management and allocation scheme is implemented in the preferred embodiment here, in the host processor. The management and allocation function is illustrated schematically in FIG. 6 and could be practiced by the DSP or auxiliary processor if desired, and is described as follows.

The resource management and allocation function keeps track of the total load that will be presented to the DSP by any user invoked tasks. The load is measured in terms of the total available DMA byte transfer bandwidth, the length of the packet list and the available DSP resource power or speed as measured in DSP execution cycles in millions of instructions per second (MIPS). The management and allocation function assures that sufficient signal processor resource will be available each 726 microsecond interval for all of the requested DSP tasks in order to guarantee that each DSP task's real-time DMA requirements may be met.

The total available resource is a function of the particular system implementation, i.e. the speed of the DSP in MIPS, the bandwidth transfer capability of the DMA mechanism and the length of a partition in a packet transfer request list to be built by the DSP. While these may all be variable according to implementation, once implemented they will be constant for the given system. The DMA bandwidth is bounded, i.e. constrained by the lesser of either the host processor's bus bandwidth, the DSP's instruction cycle time or the DMA mechanism's hardware bandwidth. The packet list size is bounded, as mentioned earlier, by the amount of the available DSP data storage and the DSP instruction clock speed.

In order to implement the resource management and allocation function, each user task at the host system will be required to contain an indication or declaration of the total DSP task resource that will be required in terms of maximum DMA bandwidth, packet list length and DSP MIPS that will be consumed at a maximum by the invoked task. As DSP tasks are requested by the end users at the host system, the resource management and allocation function in FIG. 6 allocates the declared resource requirements to the requested DSP tasks in the DSP. As long as all of the DSP task resource requirements can be met within the constraints of the system, the DSP task will be loaded into the DSP. This is done by the host system placing a DSP task request to the operating system of the DSP. If sufficient resources are not available, the DSP task request placed by the user will be rejected and an appropriate user error message will be given.

Figure 6:
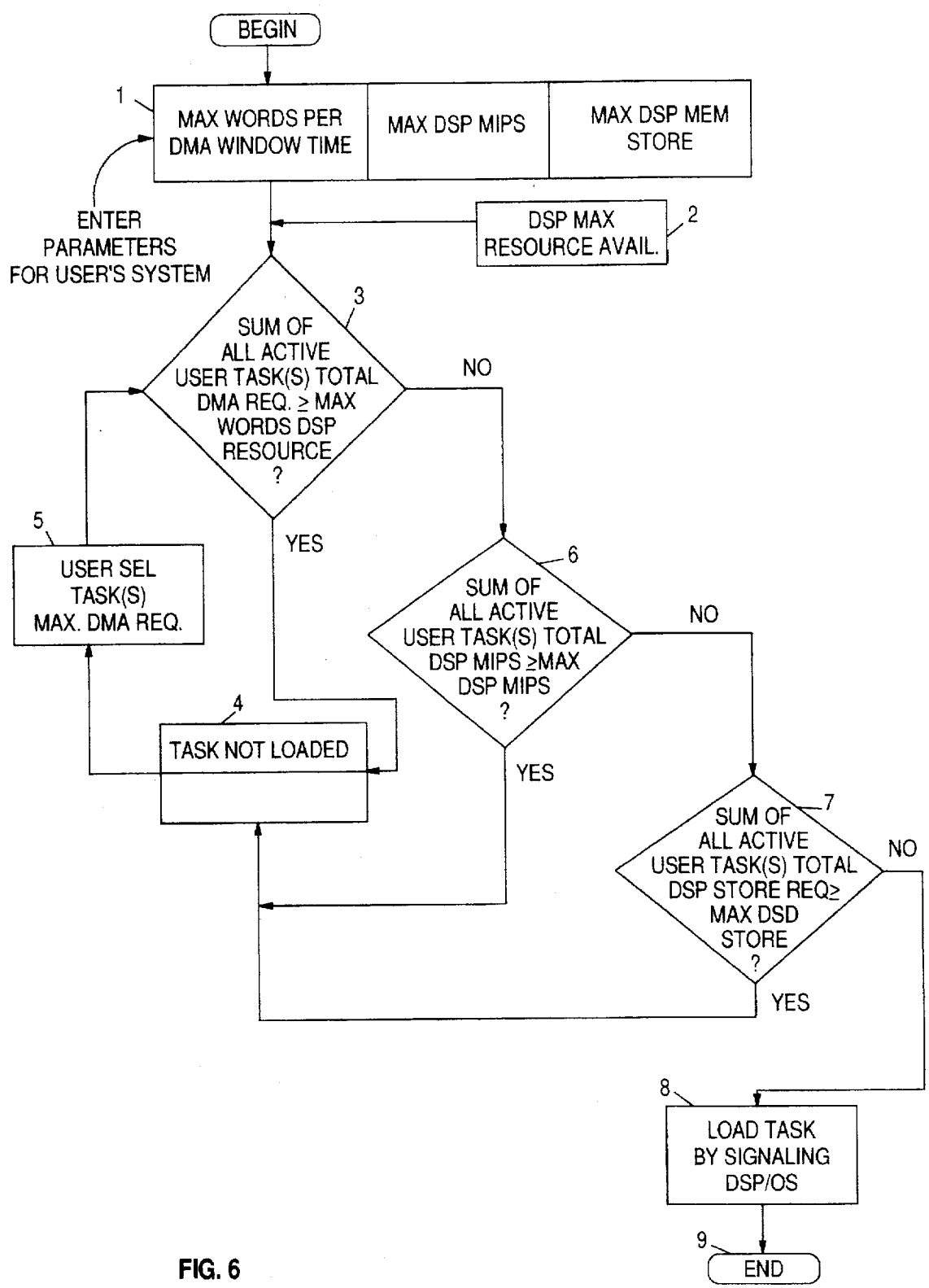
FIG. 6 illustrates the schematic flow at the host processor which builds digital signal processing task work lists or requests and manages them not to exceed the available signal processing resource of the digital signal processor.

In FIG. 6, operation is begun by the user requesting a task at his PC: for example, speech recognition. The speech recognition program in the host PC will be called up and it will contain appropriate parameters for the demands which it will place on bandwidth in terms of maximum words per DMA window time, the maximum DSP MIPS that it will require and the maximum DSP memory storage that it may invoke as shown in Box 1 of FIG. 6. The available maximum DSP resources are also known to the system as having been entered by the user or by the system interrogating hardware encoded registers (not shown) present in the DMA controller and arbiter and in the DSP. This is shown in Box 2.

In Box 3 the sum of all user task requirements, i.e. the total DMA requirement, is formed by adding together the requirements for all presently active and any newly requested tasks. This is compared with the maximum total DMA word transfer capability and the total DSP resources in Box 3. If the word transfer total demand exceeds the available resource, the task is not loaded as shown in Box 4 and a return to the user selection of tasks in Box 5 is indicated. If the user task total DMA requirement is not exceeded, the system proceeds to Box 6 where the sum of all active user task total DSP instruction execution resources is compared with the maximum available DSP MIPS. If the maximum is exceeded, the new task will not be loaded as shown by the return to Box 4 and 5. If, however, the total DSP MIPS are not exceeded, the system proceeds to Box 7 where the sum of all active user task total DSP storage requirements is made and compared with the maximum available DSP data storage size.

If the maximum is not exceeded, the DSP workload manager process (which could reside in the DSP or an auxiliary processor if desired) which performs the resource management and allocation in the PC host will proceed to Box 8 where it will load the task by signalling the operating system of the DSP to invoke the beginning of a new user selected task and then the routine ends in Box 9.

As mentioned previously, DMA data packet transfer request lists are built in partitioned form in memory of the DSP by the operating system of the DSP. As DSP task requests are brought to the DSP's operating system, it will form a list of DMA data packet transfer requests necessary to support the requested task execution. The format of the packet requests is shown in FIG. 4.

Figure 4:
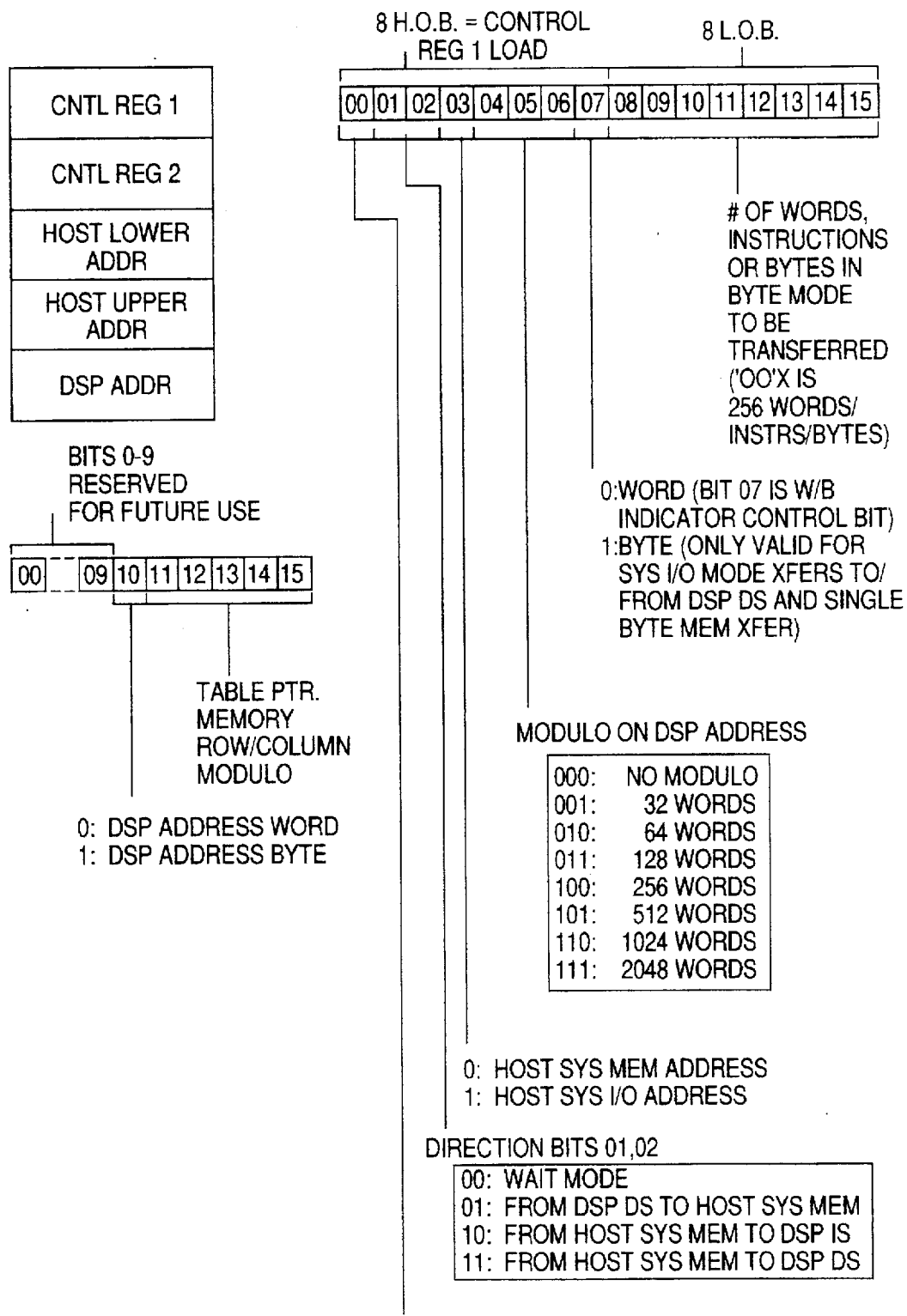
FIG. 4 illustrates in some detail the format and content of the DMA packet requests built by the digital signal processor and what the encoding of these requests may signify.

In FIG. 4, a five-word DMA packet request containing two control words which are stored in control registers 1 and 2, two words of host system memory address (being the lower address and the upper address) and one word of DSP memory address which represents the location where a number of words to be moved to or from begins. The encoding of the specific control words for the control registers is shown in FIG. 4. These control words are utilized by the interprocessor DMA arbiter and controller as will be described in greater detail later.

The operating system of the DSP builds the DMA packet transfer request lists in memory. The addressing is such that the memory operates as a circular buffer within the DSP. The packet request list is a partitioned list in that it contains a group of one or more individual DMA packet transfer requests and an ending "wait state" or "end of list" marker. The end of the list in DSP memory contains a pointer back to the beginning so that the "buffer" will be endlessly traversed. The available DSP memory for constructing the buffer must be large enough to contain at least two complete packet request lists at any instant of time. This is because the DMA controller hardware will be processing the contents of one request list while the operating system of the DSP is busy constructing the contents of the next partition of the list. The operating system of the DSP constructs the DMA packet request lists (as shown in FIG. 10) for transferring data by appending packet requests one by one to the current packet list contents as active tasks in the DSP place DMA requests either to fetch in new signal samples for processing or to transfer processed samples back to the requesting user task as appropriate.

A given task operating in the DSP requests a DMA packet transfer by first loading internally specified DSP registers with the desired source address, destination address and any control information that is necessary, and secondly by calling the operating system which appends this request to the list it is currently building in its partitioned lists. DSP tasks may make packet transfer requests at any time. Such requests may be asynchronous to the DMA arbiter and controller list execution which is conducted in the DMA control machine. The packet list execution by the DMA control machine is paced at precise intervals of time by the DSP's operating system which places a "wait packet" or "end of list marker" as a marker at the end of a partition in the packet list which it is currently building. In the preferred embodiment, these markers are pre-written in the queue in memory so that they occur at regular intervals as the queue is read by the DMA device. At precisely recurring times, the DSP signals the DMA controller to proceed with execution of the packet transfer request list which is next to be processed. The wait packet (E.O.L.) will serve as a means or a marker for stopping the DMA hardware when it has completed processing the current list. As tasks in the DSP continue making DMA packet data transfer requests, the operating system will begin filing in the next partition in the packet list. DSPs such as the Motorola 56000 referred to earlier are well known in the industry and the capability of their operating system to build such lists in memory is well understood by those of skill in the art and needs no further description here.

Figure 2:
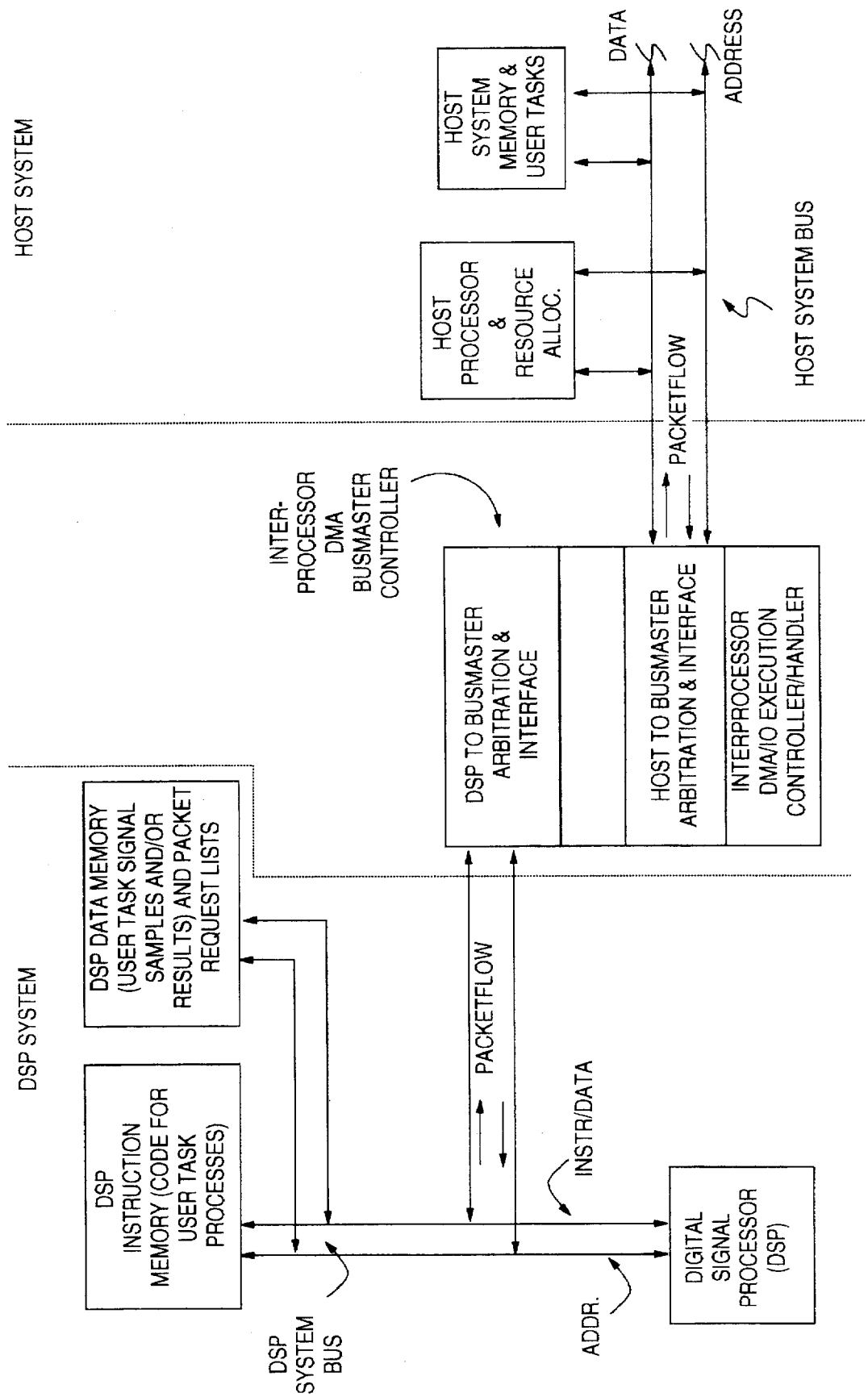
FIG. 2 illustrates schematically the interconnection between a digital signal processor system and a host computer system via the interprocessor DMA bus master and controller.

Turning to FIG. 2, the overall physical layout and data flow of packets of information from a typical host system, such as the IBM PS/2 or the Motorola 68030 mentioned previously, over their respective host system data and address buses to an interprocessor DMA controller and arbiter, such as the Intel 82325 programmable microchannel/DMA controller are shown. Interfaces from the interprocessor DMA arbiter and controller to a typical DSP such as that shown in IBM's U.S. Pat. No. 4,794,517 which is a three-phased pipelined DSP or the Motorola 56000 as previously described, are also shown. Packets of data are move to and from the host system memory to a buffer within the DMA arbiter and controller and to and from the buffer in the DMA controller over the DSP memory buses to the DSP memory for data or instructions.

A programmable interprocessor DMA/IO bus master controller and arbiter such as is commercially available in the form of the Intel 82325 chip set may be employed for these purposes. This may be referred to as the "bus master" hardware which performs the actual transfer of requested data packets between the host PC data store or memory and the DSP instruction or data store. The bus master controller may be divided into two major functional components: the packet list processor and the DMA transfer handler. The packet list processor, receives a "start" pacing signal from the operating system of the DSP at the beginning of one, for example 726 microsecond, interval. It begins reading a partition from the packet list built in the DSP's memory from the address where it last encountered a wait packet request which is a partition boundary or marker. The control and address information in the DMA packet request from the DSP memory is processed and passed to the DMA transfer handler mechanism that performs the specified DMA transfer.

Control and address information in the packet request list is processed and passed to the DMA mechanism's transfer handler which performs the specified DMA transfer as in any normal bus master driven device. The process continues packet request by packet request until a "wait packet" is again encountered. This stops the DMA bus master hardware and terminates the processing of the packet request list partition.

Return to the example alluded to earlier of a user who wishes to run at his PC a speech recognition function and a hi fi CD music playback function utilizing a DSP. First the user will request a speech recognition and hi fi function by selecting, perhaps, appropriate icons via mouse or cursor or other means at his PC. This selection will precipitate a request to load the appropriate DSP tasks. The request flows through the process shown in FIG. 6 to first ascertain that appropriate amounts of DSP resource and DMA bandwidth are available. Before these requested tasks are actually loaded, resource management and allocation functions are invoked (at the host PC in the preferred embodiment here) to verify that sufficient resource exists to satisfy the DSP task requirements that will be declared by the user's invocation of requested tasks. If sufficient resource exists as shown in FIG. 6, the tasks will be loaded and the functions will begin operation in the DSP. Otherwise, an appropriate error message will be generated by the user's host PC to notify the user that the requested tasks will not be loaded.

It is assumed in this discussion that the operating system of the DSP has already been initiated and that prior to the receipt of any newly requested DSP functions, it has been busily placing DMA transfer requests and markers for any previously requested functions in the packet list buffer and initiating or clocking the DMA controller hardware once every (partition ending) time interval, such as the assumed 726 microseconds. Assuming that no previous tasks were requested, this example will suppose that the speech recognition task declares a requirement of two DMA channels and bandwidth having a peak rate of 256 words per channel and that the hi fi task declares a one DMA channel bandwidth requirement with a peak rate of 64 words for its needs. Each time the CD task runs in the DSP it will need to move 64 more words of data from the host system processor memory in the form of digital signal samples originally read from the CD disk. These must be moved from host system memory to the DSP memory into the circular "packet list" buffer for execution. To do this, the DSP will call its operating system service routine to place the DMA request and this will be done each time the task runs, i.e. each time a 64 word sample must be processed. On each call, the DSP will provide the next host system processor memory address to be written to or read from and the next DSP buffer address at which to begin the 64 word count.

In addition, each time the speech recognition task runs in the DSP, it will call the DMA request service of the DSP's operating system. Each request will have a unique system address and a unique DSP buffer address for downloading two recognition templates from the host system each time it runs. Each template will be 256 words in length in most speech recognition programs, so, in all, three DMA requests will be written, sequentially, into the DMA packet request list by the DSP's operating system as they occur.

The three DMA packet transfer requests will be serviced by the DMA controller and arbiter hardware during the succeeding 726 microseconds following the posting of a partition marker. The marker is a wait state or E.O.L. in the DMA transfer request list segment being built by the DSP. At the beginning of this next period of time, the operating system for the DSP places a wait state packet request as a "termination marker" in the partition of the packet list it has just constructed and will start the bus master DMA hardware with a clock signal or pacing command.

The bus master DMA hardware will access the DSP memory, find the packet which requests the move of 256 words for the speech recognition task, load up the control words present in the packet request to see how many words it must move and what the modulo addressing control boundaries will be. It then reads the system host (PC) processor memory and the local DSP memory addresses from the DMA packet transfer request. It will then arbitrate for access to either the PC microchannel or other host bus and when granted access to the bus, will transfer some number (16 bytes) of data from the host processor's memory to a buffer in the DMA hardware. The DMA controller will then arbitrate for the DSP memory bus and each time it receives a grant, it will write another word into the DSP memory according to the DSP memory address which it read from the DMA packet list request. The process continues, as has been described previously, until all of the necessary DMA packets have been processed. Even if more DMA packet requests were being placed by the DSP's operating system during the current 726 microsecond interval, they will not have been serviced and will not be until the beginning of the next time interval. The process continues repeatedly until all the DSP tasks are eventually terminated by the user at the host system.

It will be appreciated in this design that the DMA packet transfer request list, together with the DSP and DMA bandwidth allocation and control process (conducted in the host PC in this embodiment) guarantees servicing and movement of all DMA data packet transfer requests within two times the basic clocking interval to the DMA processor. Thus, DMA requests pending in the partitioned list built by the DSP operating system in the DSP memory in one interval will be accessed and read by the DMA machine and executed within the next 726 millisecond time interval in the example given above. If the samples were to be taken from the host PC's memory and delivered to the DSP memory, that will occur within the 726 microsecond time interval. During the succeeding time interval, the DSP will begin processing the data samples and constructing new DMA packet requests for delivery of the processed samples back to the host system. These requests will be placed in the DMA request list partition succeeding the one presently being executed by the DMA controller and arbiter. Thus, at the next succeeding time interval, "finished samples" will be available for DMA transfer from the DSP back to the host system processor with an overall handling time delay of only two DMA intervals.

This same operating speed will be met for all pending task requests provided that the total DSP resource demanded by the tasks and the total DMA bandwidth are not exceeded. This is assured by the allocation and control mechanism operating in the host system PC. This means that real-time "hard" tasks running in the DSP can be guaranteed delivery of sufficient data or removal of processed data to meet the requirements of any requested user tasks. Since all tasks to be run in the host are required to specify ahead of time what the maximum number of words to be transferred by packet request may be and what the maximum required instruction processing MIPS at the DSP will be, the resource allocator in the host PC will know precisely how long the total DMA transfer request list may be at any given instant and when the danger of exceeding the capability exists so as not to allow invocation of any new tasks.

The DMA arbiter and controller is thus always processing DMA packet transfer requests from memory in the DSP that were placed there by tasks during a previous time interval. And, while the DMA machine works on its partition of the current DMA request list, new DMA packet transfer requests are being placed into the next succeeding partition of the DMA packet request queue in DSP memory for access by the DMA mechanism and execution at the next time interval. This design allows for a simple migration path to multiple DSP processors in a system. Each DSP processor would have its own DMA packet transfer execution hardware acting as bus master for the DSP bus or the host PC bus. In addition, if all DSPs share the same interrupt timing source clock as the DMA machine, then host system memory could provide a simple means or buffer for moving data between DSPs.

Thus it may be seen that the DMA packet request execution arbiter and controller provides a solid solution to the problem of handling a large number of communication channels or requests between the host processor and the DSP or between multiple DSPs and tasks running in all of the various processors. Attempting to implement over 100 channels of DMA utilizing hardware alone, such as by utilizing 100 unique DMA hardware devices, or 25 4-channel DMA hardware devices would result in an expensive system that would be almost impossible to arbitrate and control. The DMA controller, arbiter and list processor avoids the need for arbitration between the 100 DMA channels because they are time multiplexed in that they will all be satisfied within the recurring time interval for processing in a sequential fashion by individual bus arbitrations, grants and data transfer bursts which are guaranteed to be met within the time interval prescribed.

Figure 3:
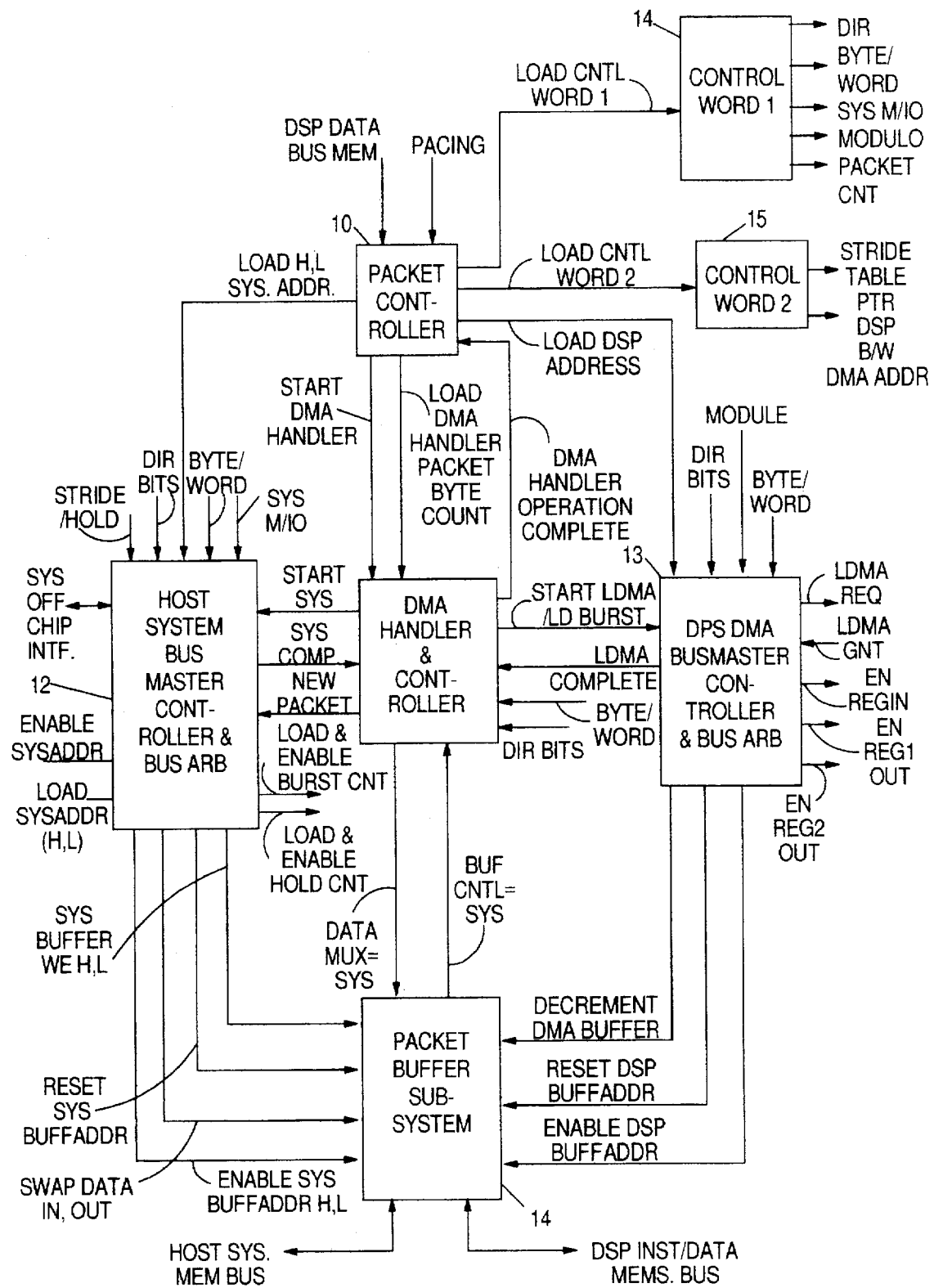
FIG. 3 illustrates schematically the flow of data in a programmable form of the interprocessor DMA I/O bus master, controller and arbiter according to the invention.

As is apparent from the foregoing discussion, the interprocessor DMA I/O bus master controller and arbiter is the key element of the system such as depicted in FIG. 2. Turning to FIG. 3, the overall data flow and main controls of the hardware of such an arbiter and controller are shown. Such a controller may be purchased commercially having sufficient hardware and software capability to carry out everything shown in FIG. 3 as the Intel Model 82325 programmable bus master controller and arbiter. The DMA/ IO bus master controller and arbiter (or simply "bus master") utilizes four hardware controllers as shown in FIG. 3. These are the packet controller 10, the DMA handler and controller 11, the local DSP DMA controller and arbiter 13 and the host system DMA controller and arbiter 12.

In FIG. 3, packet controller 10 reads packet control words from the DSP's data memory from the partitioned request list posted therein by the DSP's operating system. After reading in the five control words as shown in FIG. 4 for a given packet request, the packet controller 10 starts the DMA handler 11.

The DMA handler 11 breaks down the packet byte count indicated in the DMA packet control words into a number of bursts of data. Depending upon the direction of transfer, as indicated by the direction of transfer bit in the DMA packet request, the DMA handler 11 repetitively initiates either the host system bus master controller 12 or the DSP bus master controller 13 to cause arbitration for the appropriate buses and transfer of the appropriate size burst of data to or from the beginning addresses as noted in the DMA request packet read from the DSP memory. When the affected DMA arbiter and controller completes the DMA transfer, it signals the DMA handler controller 11 which signals either a new burst or packet or, due to keeping count, when it realizes it has exhausted the requirement of the packet by count request and acknowledges its completion back to the packet controller 10. The packet controller 10 will then read in another set of packet control words for another DMA operation and the process will continue until the DSP's DMA packet transfer control list partition has been traversed and a "wait state" packet has been encountered.

Pending DMA packet transfer requests contain the five words of information as shown in FIG. 4 where the format of the information is broken down in accordance with contents with DSP's memory starting address, the PC's upper and lower range starting addresses and the control register contents for the DMA machine. Each five word DMA packet request when fetched into the packet controller 10 of FIG. 3 is executed in a process as shown in FIG. 7 by the DMA list processor which is contained in the packet controller 10.

Figure 7B:
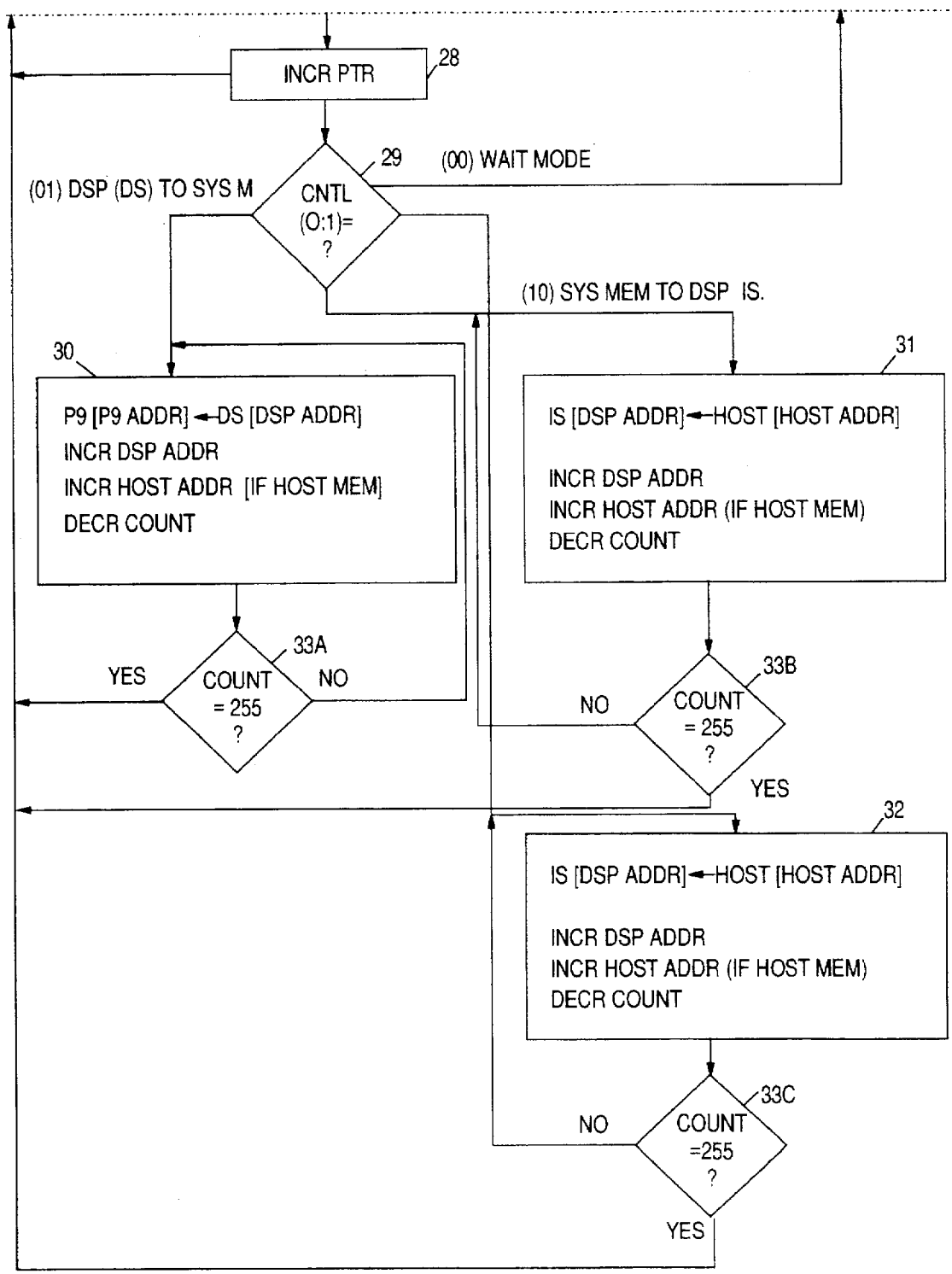
FIG. 7 shows the arrangement of FIGS. 7A and 7B which illustrate the schematic flow of operation in the interprocessor DMA controller and arbiter as it processes DMA packet request lists built in the digital signal processor.

In FIG. 7, "wait state" is a DMA packet list partition boundary indicated by direction control bits 01 and 02 from FIG. 4 both being zero as indicated on FIG. 4. Wait state is the beginning point for execution of a DMA list process in processor 10 of FIG. 3. It begins at Box 20 and flows through Boxes 21, 22, 23, 24 or onward to Boxes 25–28 as shown in FIG. 7. The directional control bits are read in Box 29 of FIG. 7 and an appropriate decision is made to enter wait mode or to transfer from the host system memory to the DSP memory or from DSP memory to the host system memory in accordance with the content of the indicator bits 01 and 02 from FIG. 4. Blocks 30–32 are the pointer incrementation controls and Boxes 33A, 33B and 33C compare the total count up to a maximum of 255 (equal to 256 words maximum).

Figure 5:
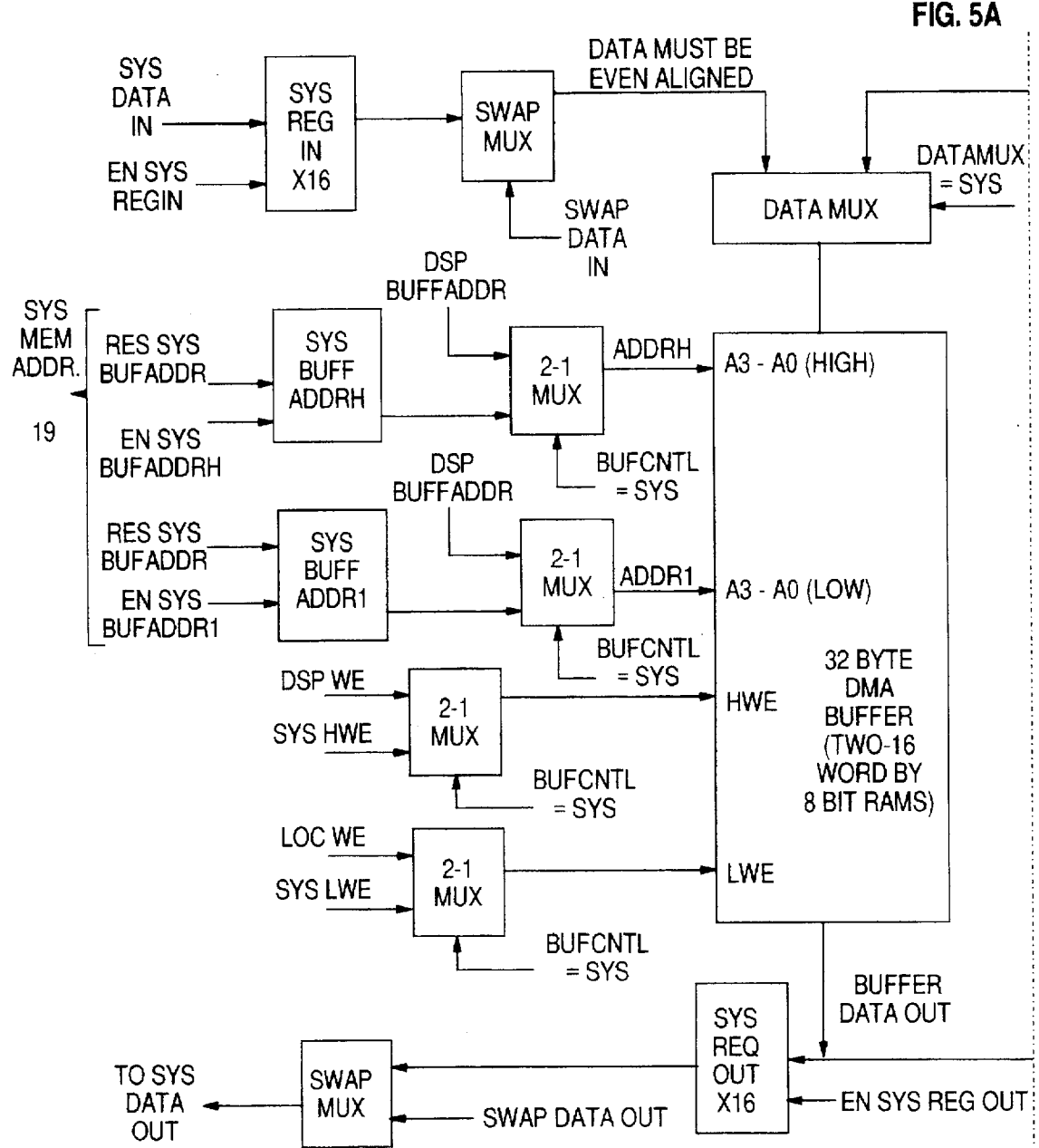
FIG. 5 shows the arrangement of FIGS. 5A and 5B which illustrate the flow of data in and out of the packet buffer and registers for data flow and control within the interprocessor DMA controller and arbiter.
Figure 5:
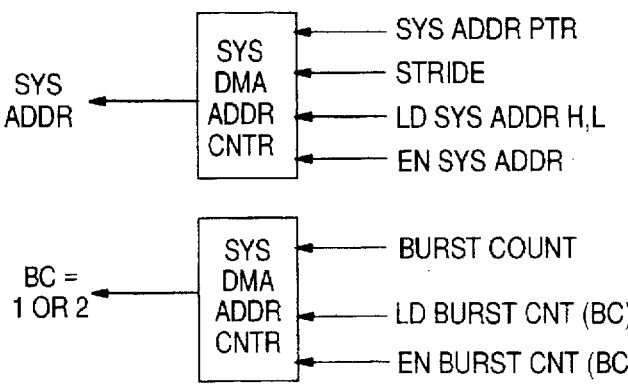
Figure 5B:
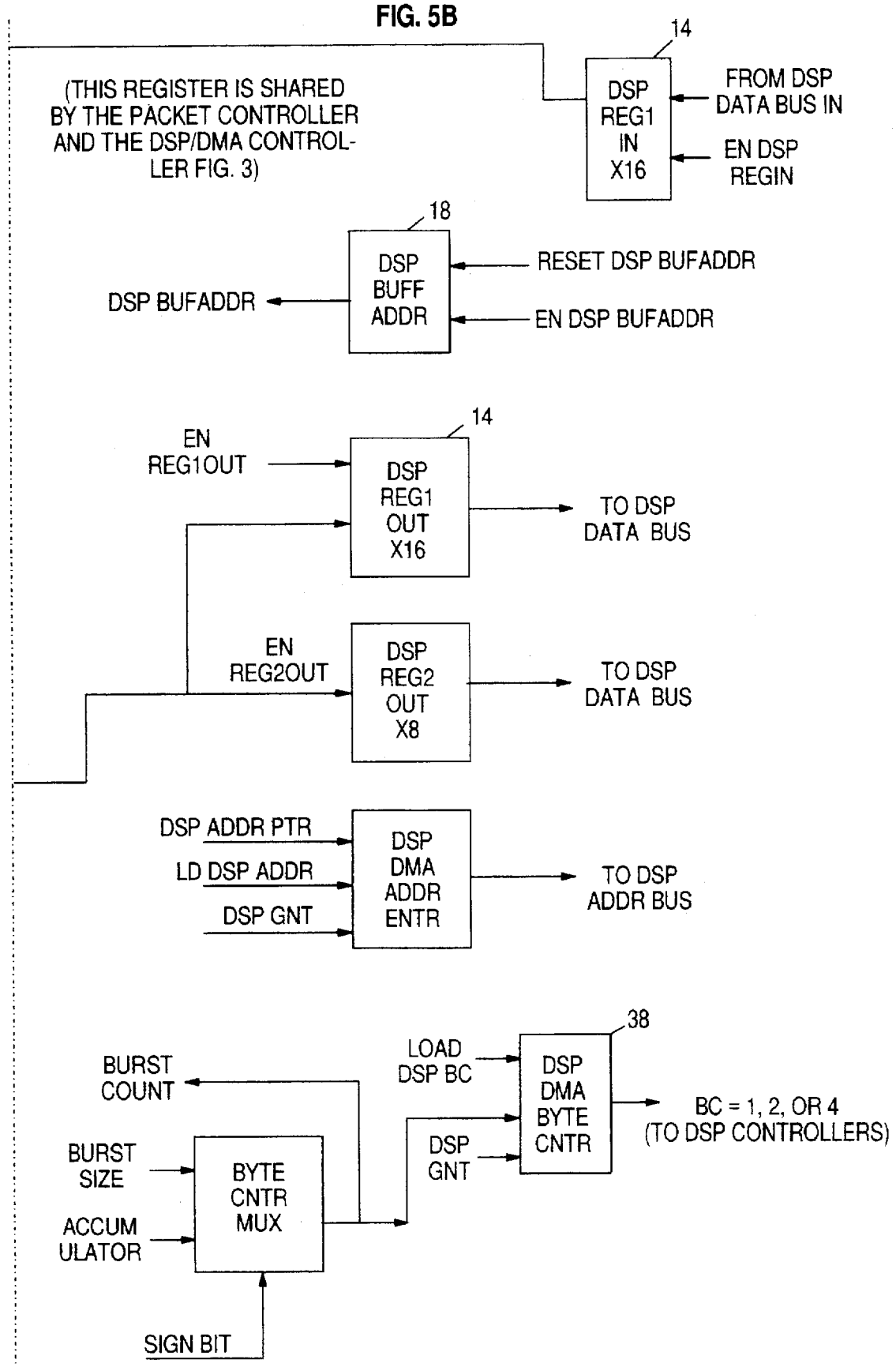

FIG. 5 shows schematically some of the effective buffers and registers contained in the DMA arbiter and controller in packet control block 10 of FIG. 3. In FIG. 5, register 14 is made up of several segments as shown and is the DMA packet pointer. It is a 16-bit register that can only be read by the DSP and contains the 12 least significant bits of the pointer to the DMA packet request list in the DSP data store. The register is updated by hardware and the three high order bits will be zero. The three lowest order bits and bit 15 do not exist as such and are read as zeros in the implementation given. The data in the data storage that will be loaded into this register is stored as a byte address. Register 19 is composed of several parts and contains the system or host system memory address. It is a 32-bit register that is not readable or writable by either the DSP or by the system processor for the host system. It contains the address to the host system memory or I/O space that will be used for packet transfer. The lower 24 bits of this register 19 are autoincrementing for the host system processor memory transfers. The selection of memory or I/O space is indicated by the system memory/IO bit. The address stored in this register is a byte address.

Register 18 is the DSP memory address and is a 16-bit auto-incrementing register which is not readable or writable by either the DSP or the host system PC. It contains the address to the DSP's data or instruction store that will be used for packet transfer. Modulo control bits are used to control incrementing of this register. The data in the data store that will be loaded into this register is stored as a word or instruction address with only the lower 15 bits used to form an address to the data store.

The DMA handler 11 in FIG. 3 is initiated by the start DMA signal from the packet controller 10 as shown in FIG. 3. The DMA handler 11 initially converts the packet count received from the packet controller 10 into a packet byte count. The DMA handler's function is to break down the packet byte count into burst counts since the internal buffer of the DMA controller mechanism contains two 16-byte by 8-bit RAMs in the present embodiment so that the burst size is limited to 32 bytes at a time. If the byte or word bit from the control registers shows byte mode, data will not be packed in the data store. Only the lower order byte of data store is used for the bus master operations. Under this condition a normal burst size of 16 bits is used.

DMA transfers take place utilizing the burst count (bc). The bc is equal to the burst size except when the remaining or beginning packet count is less than the burst size. The packet byte count is repetitively broken down into bursts until it has been exhausted.

Figure 8:
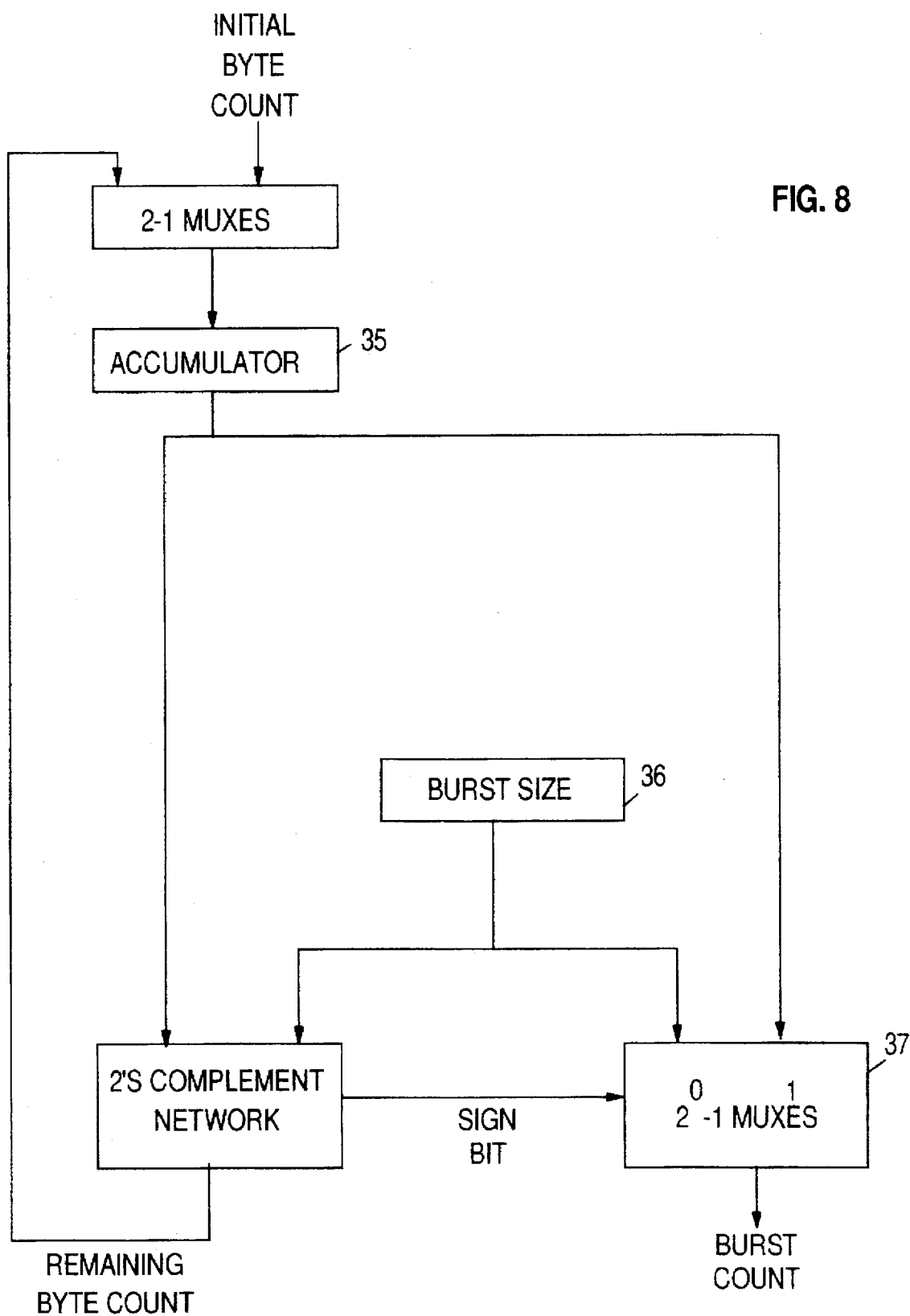
FIG. 8 illustrates a portion of the DMA handler hardware for a preferred embodiment of the invention.

In FIG. 8, the initial byte count is loaded into the accumulator 35. The DMA handler hardware 11 contains the hardware shown in FIG. 8. The burst size is based on the value of the byte/word bit contained in the control information in the DMA transfer request. If the sign bit is zero, this means the value in the accumulator 35 is greater than the burst size. The burst size is preselected according to the system being utilized as described earlier. Byte count is loaded into the system and into the DSP's DMA byte counter and the DMA handler 11 looks at the direction bits.

If the direction bits read in Box 29 of FIG. 7 indicate a read from the host system memory, the DMA handler 11 switches controls of the input data multiplexer to the system data port as shown at the output of Box 11 in FIG. 3. The system buffer controls will also be selected and the DMA handler 11 will start the system master controller 12. System master controller 12 will proceed to load internal RAM buffer 14 and will interpret the operation as a read from the host system memory to the buffer. After writing data to the buffer 14, the system master controller 12 will acknowledge completion of the transfer back to the DMA handler 11 as shown by the signal line in FIG. 3.

Upon receiving the completion signal, the DMA handler 11 will then switch the buffer controls to the DSP's DMA controller 13. The DMA handler 11 will then start the DSP's DMA controller 13 which will proceed to transfer data from buffer 14 to the DSP memory, and upon completion, will acknowledge back to the DMA handler 11 that it has completed the transfer.

If the DMA handler 11 detected a write to system memory as the direction of transfer, the DMA handler controller 11 will switch controls of the input data multiplexer to the DSP DMA data port and the DSP's DMA buffer controls will be selected for buffer 14 for the DSP's DMA controller 13. DMA handler 11 will then start the DSP DMA controller 13 which will interpret the operation as a read from the DSP memory to the buffer 14. Controller 13 will proceed to load up buffer 14 and after reading the data into buffer 14 will acknowledge completion of the transfer back to the handler 11. When it detects that the DSP DMA operation has been completed, the DMA handler 11 will switch the buffer controls to the system side, initiate the host system bus master controller 12, and transfer data from buffer 14 to the host system memory. Upon completion, controller 12 will acknowledge that fact back to the DMA handler 11.

After the first burst has been transferred, DMA handler 11 loads the accumulator 35 in FIG. 8 with the remaining byte count. If, once again, the sign bit is zero, the burst count is set equal to the burst size and this amount of data is transferred via DMA operation. However, if the sign bit is a 1, the count in the accumulator 35 will be less than the burst size in the burst register 36. The two to one multiplexer 37 will then select the content of the accumulator for the last and final DMA transfer. A 1 for the sign bit is taken as a negative number and a 0 for the sign bit is taken as a positive number or 0. Zero detection is important since it is the indication that a burst count of zero should not be performed. After the packet byte count is exhausted, DMA handler 11 responds to the packet controller 10 in FIG. 3 with an acknowledgement of completion.

The DSP's DMA arbiter and controller 13 of FIG. 3 is a portion of the aforementioned Intel 82325 programmable DMA I/O controller. It utilizes the DSP address counter with modulo as well as byte counter contents loaded with the burst count as shown by the outputs from Box 14 and 15 directed into Box 13 in FIG. 3. Packet controller 10 loads the address counter in 13 and the DMA handler controller 11 loads the byte counter and resets the internal buffer address when initiating the start of DSP DMA operations. DMA handler 11 also sets up the DMA buffer data paths and controls prior to starting the DSP's DMA controller 13. The DSP's DMA byte count counter in 13 counts by one or two whenever the bus master's operation involves a data storage. The byte counter counts by one in byte mode and two in word mode. The byte counter counts by four when the operation involves an instruction store as may be seen in Block 38 of FIG. 5. Upon receiving a start signal the DSP DMA controller 13 operates either to read data from the DSP and store it in the internal buffer 14 or to read it from buffer 14 and store it in the DSP or to read the buffer and store it in the instruction store of the DSP in accordance with the control bit information direction bits 01, 02 as shown in FIG. 4.

The host system bus master controller and arbiter 12 in FIG. 3 is also a portion of the Intel 82325 chip. This controller is responsible for the bi-directional movement of data between the host PC buses and internal RAM buffer 14 in FIG. 3. This controller 12 utilizes an eight-point grey code sequencer which is clocked at 30 nanoseconds and gives burst cycles of 240 nanoseconds. The controller contains the logic for arbitrating for the host system bus, byte alignment, data steering, stride and hold functions for modulo memory addressing and internal buffer packing logic. By "stride" is meant the increment of address jumping from a starting address in memory to the next succeeding starting address. By "hold" is meant the number of words (addresses) from a beginning address that are to be read out each time. By "skip" is meant the number of words (addresses) not read (i.e. the number of words by which "stride" exceeds "hold" values). The controller 12 interfaces to the packet controller 10 and DMA handler 11 as shown in FIG. 3. The interface to the packet controller 10 is simply a control word interface and the control word parameters from the control word in FIG. 4 are passed to the host bus master and arbiter. These include the direction bits, the byte word indicator, the system upper and lower addresses, etc. as shown in FIG. 3. The direction bits inform the controller 12 whether to perform read or write operations on the host system memory. The system M/IO bit informs the controller 12 whether to read or write either the host PC's memory or its I/O space. The upper and lower system addresses concatenated together specify the starting address used by the controller 12 for bus master operations. The system address counter is capable of incrementing over 20 bits so all operations are ordered on 1 megabyte boundaries. The stride/hold and enable bits inputted to controller 12 from packet controller 10 allow the system host address incrementer to have the capability to jump, i.e. do a modulo or block memory addressing when enabled. The stride and hold values are byte values passed to the controller 12 by the packet controller 10. The "hold" value is inclusive within "stride" in the general formula "hold plus skip equals stride" as alluded to earlier.

DMA handler 11 initiates the start of operations at the system bus master controller and arbiter 12. Once initiated, the controller 12 has complete control of the internal RAM buffer 14 to which it provides buffer addresses and the write enable signals and accepts or receives buffer data. The burst count and the new packet count parameters are passed by the DMA handler 11 to the controller 12.

Figure 9B:
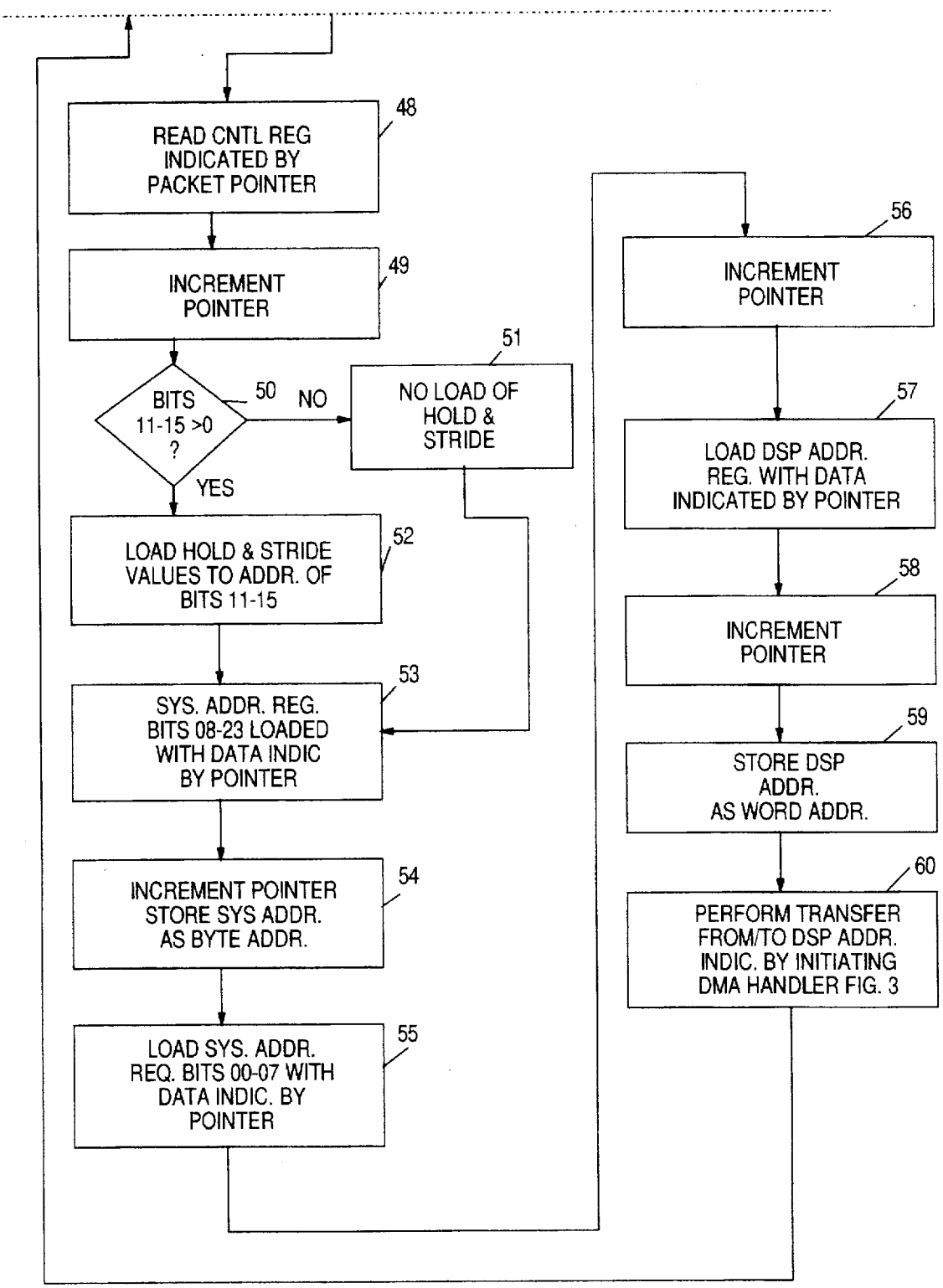
FIG. 9 shows the arrangement of FIGS. 9A and 9B which illustrate the DMA transfer process executed by the DMA interprocessor arbiter and controller.

The overall operation of the packet controller 10 is initiated by a signal from the DSP referred to previously as the "pacing" control. Beginning in FIG. 9, the flow of operations at the packet controller 10 of FIG. 3 are detailed. The packet controller 10 begins with the pacing signal from the DSP. In Box 40 it accesses the DSP's data memory where the DMA packet list resides and reads the cycle counter. It gets the first DMA packet pointer start position in Box 41 from the DSP and then reads the DSP data memory and cycle counter in Block 42. In Block 43 the pointer is incremented and a test is made in Block 44 to see if the end of the packet list in the DSP's DMA packet request list has been reached. If the end has not been reached, the controller reads the direction bits in Box 45 and, if both are 0, indicating that a "wait mode" packet has been encountered, it increments the packet pointer four times in Block 46 and returns to Block 40 to await a new pacing signal.

If the "wait mode" bits have not been encountered, operation continues to Box 48 where the control register is read as indicated by the packet pointer. In Box 49 the pointer is incremented and a check is made of the high order bits to see if they are greater than 0. If they are greater than 0, in Box 51 no loading of the hold and stride parameters is made. However, if the bits 11–15 are non-zero, the load is made for hold and stride values to the address of the bits contained in bits 11–15 from the control word registers 1 and 2 as shown in detail in FIG. 4.

In Box 53 the system address register bits 08–23 are loaded with the data that is indicated by the pointer which is then incremented in Box 54 and the system address is stored as the byte address. The system address is loaded with the register bits 00–07 in Box 55 with any data indicated by the pointer and the pointer is incremented in Box 56 where the specified DSP address register is loaded with the data indicated by the pointer which is then incremented in Box 58.

In Box 59 the DSP address is stored as the word address and the transfer is performed in Box 60 from or to the DSP address that is indicated by initiating the DMA handler 11 of FIG. 3. Operation continues back to Box 42 to read the next DSP data memory address, etc. Checks are made again for the end of the list in Box 44 and if the end of the list has been reached, Box 47 is encountered which loads the DMA pointer address with the packet pointer starting position so that the packet controller will loop back to the next partition of the segmented DMA request list built by the DSP.

From the foregoing it will be instantly appreciated that what has been described is an overall computer system comprised of a DMA subsystem and a host to DMA and DMA to DSP set of subsystem which are uniquely suited to the demands of hard, real-time multitasking applications such as those encountered in a multimedia computer system. The elements of the overall multimedia computer system comprise well known and commercially available components including DSPs, DMA I/O arbiters and controller chips and host PC system computers as have been variously described and alluded to above.

It is the configuration of the system and the subsystem and the means of control and of communication between the subsystems and the individual processors that have provided the unique benefits of the present invention, wherefore it will be evident to those of skill in the art that numerous departures in the hardware/software structure of the system and subsystems included in it will be possible without departing from the spirit and scope of the method of operation or the functional system structure. For example, while currently available signal processor speed and memory capacity are excellent, still faster processors with larger memory may soon be available, whereupon relocation of the resource management function from the DP to the DSP will be practical; or, on the contrary, relocation of the management of DSP resource demand may be allotted to an auxiliary processor in the same system as the DP and DSP or the DSP may have such speed and memory capacity that it is able not only to perform DSP tasks but to manage allocation of its own resource and actually run user tasks as well in place of the DP, all without departing from the spirit and scope of this invention. Also, the DMA may be replaced entirely when the DSP takes on direct execution of user task programs, so an inter-processor DMA I/O controller will not be required so long as the DSP's operating system can manage and allocate the DSP signal processing resource with managed task lists, just as the DMA I/O controller and DSP packet lists are managed in the preferred embodiment. For example, the DSP's packet list requests could be processed and handled by the DSP itself, as could the initial allocation of resource task, once a DSP of sufficient speed and resident memory capacity is available. In brief, the invention here contemplates the performance of user tasks, resource allocation, data transfer list building, execution of signal processing tasks in support of user tasks, and total substitution of the DMA function by using a single DSP itself once higher speeds of execution and/or greater memory capacities are available in such DSPs. Wherefore what is desired to be protected by letters patent and which is claimed is set forth by way of example and not by way of limitation in the following claims.

We claim:

1. A method of controlling operation in a multimedia computer system having a first digital processor, DP, for executing user task programs, a second digital processor, DSP, for executing digital signal processing programs in support of execution requirements of said user task programs in said DP, and a host system bus for moving data and direct memory access (DMA) transfer requests between said DP and said DSP, the method comprising steps executed at said DP of:

receiving, through said host system bus, DSP resource parameters of maximum words per DMA window of time, maximum DSP million instructions per second (MIPS), and maximum DSP memory storage;

receiving a user selected DSP task's maximum DSP resource requirements;

determining if a sum of words per DMA window of time of all active DSP user tasks being executed at said DSP plus the words per DMA window of time of newly requested tasks to be executed at said DSP is greater than or equal to said parameter of maximum words per DMA window of time;

if said sum of words per DMA window of time is less than said parameter of maximum words per DMA window of time, determining if a sum of MIPS for all active DSP user tasks being executed at said DSP plus the sum of MIPS for newly requested tasks to be executed at said DSP is greater than or equal to said parameter of maximum DSP MIPS;

if said sum of MIPS for all active user tasks being executed at said DSP is less than said parameter of maximum DSP MIPS, determining if a sum of DSP memory storage requirements for all active DSP user tasks being executed at said DSP plus DSP memory storage requirements for newly requested user tasks being executed at said DSP is greater than or equal to said parameter of maximum DSP memory storage; and loading said user selected DSP task if said sum of DSP memory storage requirements for all active and newly requested DSP user tasks being executed at said DSP is less than said parameter of maximum DSP memory storage.

2. The method according to claim 1 further comprising the steps of:

not loading said user selected DSP task if said sum of words per DMA window of time is greater than or equal to said parameter of maximum words per DMA window of time; and receiving a new user selected DSP task's maximum DSP resource requirements.

3. The method according to claim 1 further comprising the steps of:

not loading said user selected DSP task if said sum of MIPS for all active user tasks is greater than said parameter of maximum DSP MIPS; and receiving a new user selected DSP task's maximum DSP resource requirements.

4. The method according to claim 1 further comprising the steps of:

not loading said user selected DSP task if said sum of DSP memory storage requirements is greater than or equal to said parameter of maximum DSP memory storage; and receiving a new user selected DSP task's maximum DSP resource requirements.

5. A multimedia computer system for executing user task programs which place signal processing demands on said system, the system comprising:

a digital processor, DP, for executing user task programs;

a digital signal processor, DSP, for executing DSP user tasks;

a host system bus for moving data and DMA transfer requests between said DP and said DSP, said host system bus connected to said DP and to said DSP;

means for sending over said host system bus DSP resource parameters of maximum words per DMA window of time, maximum DSP million instructions per second (MIPS) and maximum DSP memory storage;

an inter-processor direct memory access input and output controller, DMA/IO, for controlling the movement of data and DMA transfer requests between said DP and said DSP over said host system bus; and means at said DSP for loading a new user task only if said DSP resource parameters will not be exceeded by the DSP resources of active DSP user tasks being executed plus the DSP resources of the new user task.

6. For use in a multimedia computer system having a host digital processor, DP and a host system bus connected to said DP, a multimedia task computer subsystem, comprising:

a digital signal processor, DSP, for executing DSP user tasks;

means for sending over said host system bus DSP resource parameters of maximum words per DMA window of time, maximum DSP million instructions per second (MIPS) and maximum DSP memory storage;

an inter-processor direct memory access input and output controller, DMA/IO, for controlling the movement of data and DMA transfer requests between said DP and said DSP over said host system bus; and means at said DSP for loading a new user task only if said DSP resource parameters will not be exceeded by the DSP resources of active DSP user tasks being executed plus the DSP resources of the new user task.

\* \* \* \* \*